United States Patent [19]

Seibert

[11] 4,436,162

[45] Mar. 13, 1984

[54] IMPLEMENT ATTACHMENT FOR THE FRONT END OF A TRACTOR

[76] Inventor: Michael J. Seibert, Rte. 5, Bryan, Ohio 43506

[21] Appl. No.: 311,560

[22] Filed: Oct. 15, 1981

[51] Int. Cl.³ .............................................. A01B 3/76
[52] U.S. Cl. ...................................... 172/810; 172/439
[58] Field of Search ...................... 172/817, 439, 445.2, 172/810, 811, 834, 443, 449

[56] References Cited

U.S. PATENT DOCUMENTS

| | | | |
|---|---|---|---|
| 2,426,410 | 8/1947 | Owen | 172/817 X |
| 2,608,924 | 9/1952 | Bywater | 172/810 |
| 2,609,741 | 9/1952 | Evenson | 172/810 |
| 2,629,944 | 3/1953 | Arps | 172/817 X |
| 2,733,525 | 2/1956 | McMahon | 172/817 |
| 2,996,817 | 8/1961 | Bennett | 172/817 |
| 3,013,350 | 12/1961 | Fox | 172/817 X |
| 3,145,781 | 8/1964 | Rogler | 172/439 X |
| 3,542,136 | 11/1970 | Coontz | 172/817 |
| 3,548,956 | 12/1970 | Hochstetler | 172/817 |
| 3,604,517 | 9/1971 | Clifford | 172/225 |
| 3,623,310 | 12/1952 | Raught | 172/810 |
| 3,944,000 | 3/1976 | Lely | 172/49.5 |
| 4,181,181 | 1/1980 | Old | 172/810 |

FOREIGN PATENT DOCUMENTS 2311494 12/1976 France .............................. 172/439

Primary Examiner—Richard J. Johnson
Attorney, Agent, or Firm—George E. Gust

[57] ABSTRACT

An implement attachment for the front end of a tractor comprises a tractor frame having transporting wheels and a frame device fixedly carried by the tractor frame, which extends parallel to the direction of transport. The frame device projects forwardly beyond the front end of the tractor. An actuating linkage movably carried by the tractor and also projects forwardly thereof and in combination with the frame device carries a three point hitch, one of the three points being on the linkage and the other two being on the frame device. The two hitch points are horizontally spaced transversely of the tractor and the one hitch point is disposed above such two hitch points. A conventional three point hitch can be connected to the three hitch points and manipulated by means of the actuating linkage.

4 Claims, 9 Drawing Figures

U.S. Patent  Mar. 13, 1984  Sheet 1 of 2  4,436,162
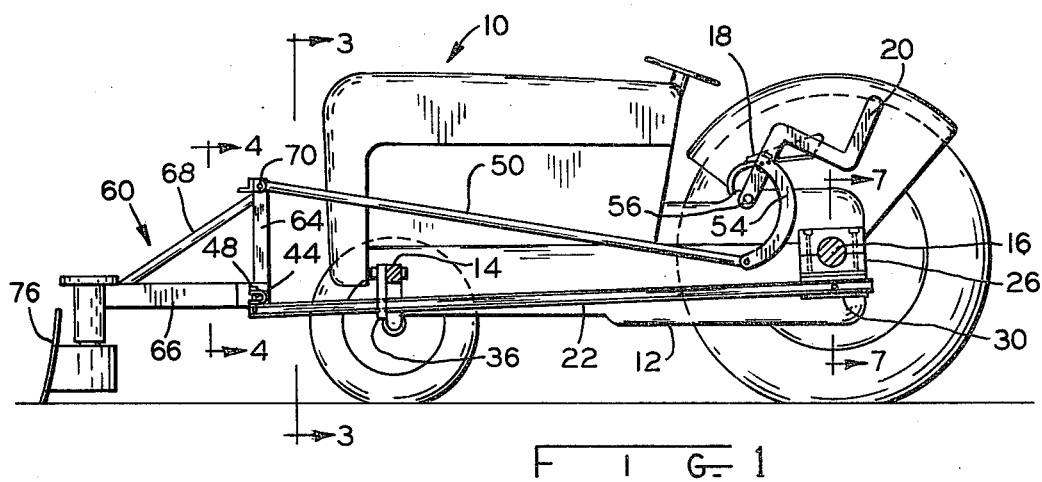
FIG. 1
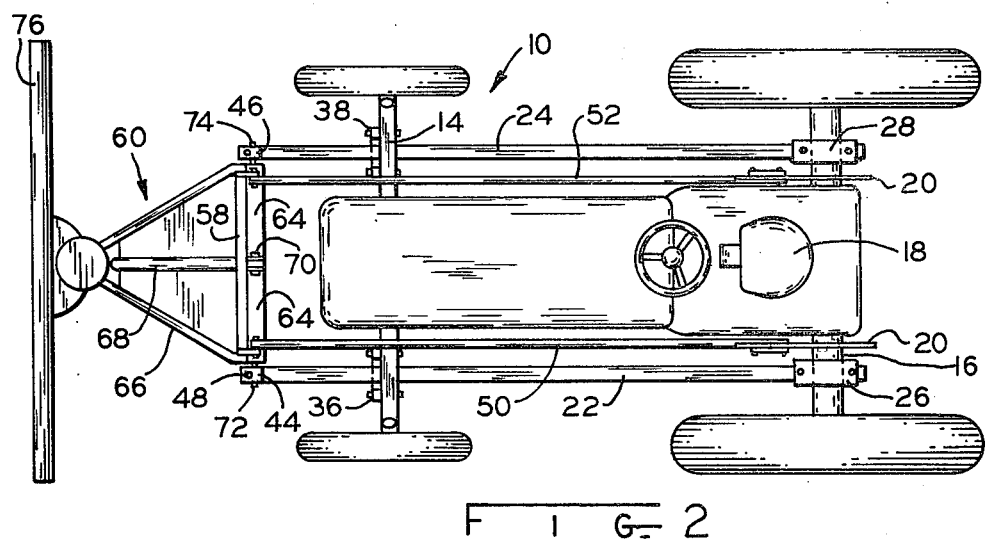
FIG. 2
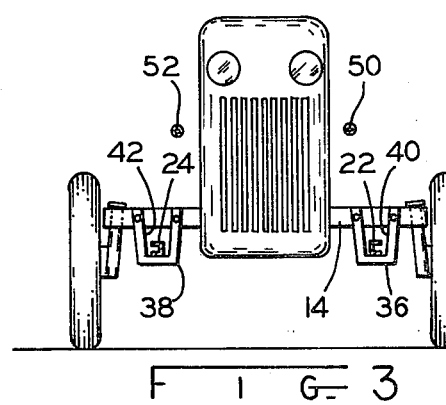
FIG. 3
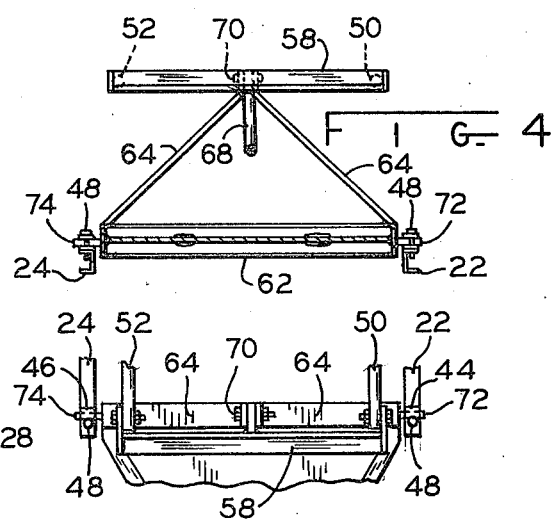
FIG. 4
FIG. 5
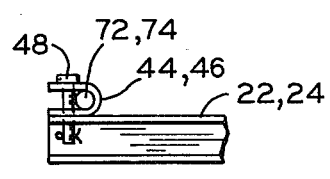
FIG. 6
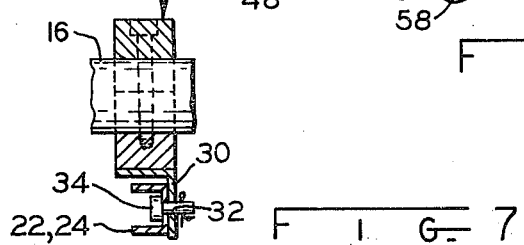
FIG. 7

IMPLEMENT ATTACHMENT FOR THE FRONT END OF A TRACTOR

BACKGROUND OF THE INVENTION

1. Field of the Invention

The present invention relates to tractor hitches and more particularly to an implement attachment for the front end of tractors.

2. Description of the Prior Art

Various implement attachment devices are disclosed in prior U.S. Pat. Nos. 2,426,410; 2,623,310; 2,269,944; 2,733,525; 3,548,956 and 3,604,517. Three point hitches are conventional and somewhat standardized to the extent that such a hitch purchased from one supplier will fit the same hitch attachment of a different supplier. Such hitches are usually provided on the rear ends of tractors such that implements connected thereto are always located at the tractor rear.

Different types of front end hitches appear in the prior art, certain of these being disclosed in the above-mentioned patents. However, none of these disclose a front end attachment by means of which a three point hitch may be front mounted and manipulated from the driver's seat on the tractor.

SUMMARY OF THE INVENTION

The present invention relates to an implement attachment for the front end of a tractor. A tractor frame having transporting wheels thereon fixedly carries a frame device which is elongated and extends longitudinally of the tractor. The frame device projects forwardly beyond the front end of the tractor. An actuating linkage is movably carried by the tractor frame and also projects forwardly of the front thereof. Such linkage and the frame device conjointly provide forwardly of the tractor a three point hitch, one of the three points being on the linkage and the other two being on the frame device. The two hitch points are horizontally spaced transversely of the tractor and the one hitch point is disposed thereabove. A conventional implement and three point hitch may be connected to the three hitch points and manipulated by the tractor operator by means of an implement lift lever situated adjacent to the operator's seat on the rear of the tractor.

It is an object of this invention to provide a convenient mounting for a three point hitch on the front end of a tractor.

It is a further object to provide a front end implement attachment for a tractor which is capable of limited vertical, floating movement relative to the tractor, which serves in isolating some of the vertical motion of the tractor front end from being transmitted to the attachment.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

In the drawings, FIG. 1 is a side elevation of one embodiment of this invention as mounted on a tractor, the wheels on one side of the tractor being removed;

FIG. 2 is a top plan view thereof;

FIG. 3 is a front, sectional view taken substantially along section line 3—3 of FIG. 1;

FIG. 4 is another sectional view taken substantially along section line 4—4 of FIG. 1;

FIG. 5 is a fragmentary top view of the hitch mechanism of FIG. 4;

FIG. 6 is a fragmentary side view showing the pivot connection between one of the pivot pins of the three point hitch and the attachment device of this invention;

FIG. 7 is also a fragmentary, partially sectioned view of a means for attaching the rear end of an attachment frame member to the rear end of the tractor;

DESCRIPTION OF THE PREFERRED EMBODIMENT

Figure 8:
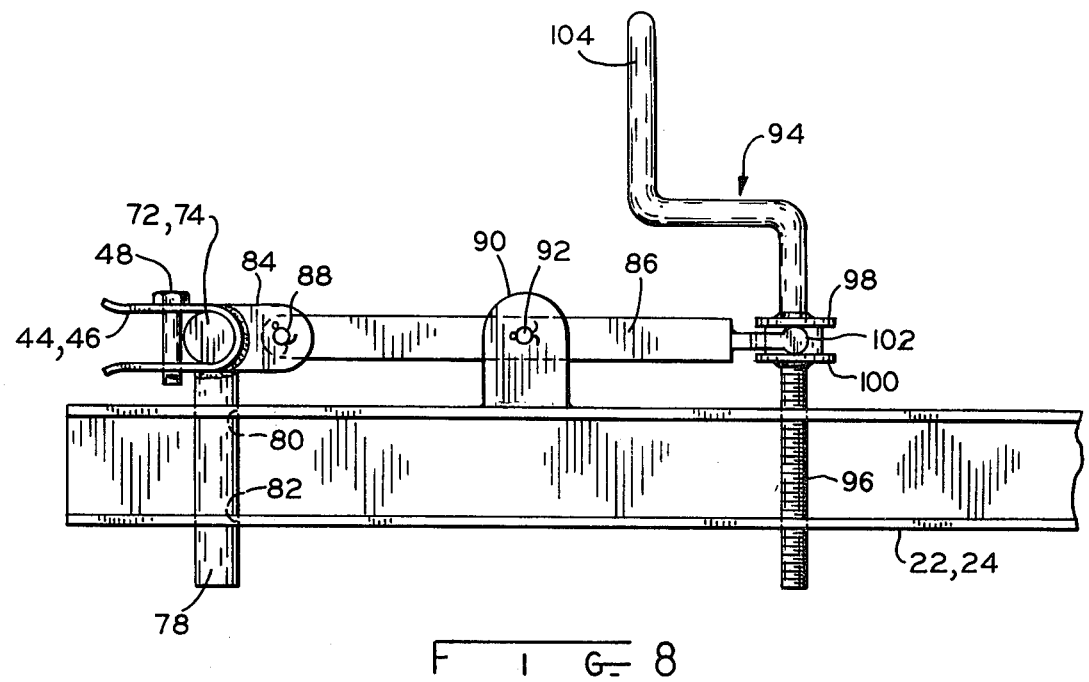
FIG. 8 is an enlarged, fragmentary side view of another embodiment of the attachment device.

Referring to the drawings, a conventional farm tractor is indicated by the numeral 10. The tractor includes the usual tractor frame 12 having a transverse frame member 14 at the front end of the tractor and a similar frame member 16 at the rear. The rear frame member 16 may be in the form of the axle housing, but suffice it to say, the term "tractor frame" is intended to include those rigid portions of the tractor which are secured to the main supporting frame.

The tractor further includes front and rear transporting wheels and a driver's seat 18 from which the tractor as well as the implements connected to the tractor may be operated.

Pivotally mounted on the rear of the tractor is the conventional implement lift lever 20 to which is connected a conventional three point hitch (not shown) which mounts the usual three point hitches and implements connected thereto. The present invention is intended to be an addition to this rear hitch mechanism by means of which a similar three point hitch and corresponding implements may be connected and operated at the front end of the tractor.

This front end attachment includes two rigid, elongated frame members 22 and 24 in the form of channel irons which are spaced apart and parallel and extend longitudinally of the tractor along the sides thereof as shown. The rear ends of the frame bars 22 and 24 are removably connected to the rear ends of the tractor by means of a suitable quick disconnect device. In the embodiment shown, this quick disconnect device includes two, two-part clamping blocks 26 and 28 rigidly secured to the tractor frame or axle housing by means of suitable threaded fasteners as shown. To the underneath side of each two-part block is secured a short length of angle iron 30 (see FIG. 7) which provides a depending flange having a horizontal, pin-receiving hole 32 therein. The rear ends of the two frame bars 22 and 24 are provided with mating holes, each receiving a headed pin 34 whereby the respective frame bar is secured to the angle iron 30 and the two-part block 26, 28. A suitable cotter key may be fitted to the connecting pin 34 as shown. By means of these pin connections, the rear ends of the two frame bars 22 and 24 can pivot in vertical planes about a common horizontal axis.

At the front end of the tractor and rigidly secured to the transverse frame member 14 are two U-shaped brackets 36 and 38 each defining relatively large openings or eyelets denoted by the numerals 40 and 42 which receive therethrough the respective frame bars 22 and 24. As shown in FIGS. 1 and 2, the frame bars 22 and 24 extend forwardly in front of the tractor and are positioned normally by resting on the horizontal portions of the U-shaped brackets 36 and 38. As clearly shown in FIG. 3, the openings 40 and 42 are substantially larger vertically than the corresponding dimensions of the frame bars 22 and 24 such that the latter may move vertically within the openings 40 and 42. The limit of movement is determined by the upper and lower portions of the openings 40, 42.

To the front ends of the two frame bars 22 and 24 are secured two U-shaped pivot retainers 44 and 46, one leg of each of these retainers being welded or otherwise secured to the respective frame bar 22, 24 so as to position the retainer with the opening thereof facing forwardly. The two legs of each retainer 44 and 46 are provided with holes as is the respective frame bar 22, 24 for removably receiving a headed locking pin 48. Since the pin 48 is vertically arranged, insertion thereof is very simple, since it only needs to be entered into the top most hole and thereafter permitted to drop into place.

An actuating linkage is provided in the form of two bars 50 and 52 which are spaced apart and parallel and extend longitudinally of the tractor on opposite sides thereof. At the rear ends, these bars are pivotally connected to an arm 54 on the implement lift lever 20. In a typical installation, two such lift levers 20 may be mounted on opposite sides of seat 18, these being rigidly connected together such that the operation of one results in operation of the other. The lever arm 54 is integrally formed with or otherwise secured to, by means of welding or the like, lift lever 20. The lift lever 20 itself may be pivoted to the tractor frame at a location such as that indicated by the numeral 56.

The two bars 50 and 52 extend forwardly of the tractor such that the front ends thereof are disposed immediately above the front ends of the two frame bars 22 and 24. A transversely extending crossbar 58 is secured at its ends to the front ends of the two actuating bars 50 and 52 as shown. This crossbar 58 is otherwise arranged horizontally and parallel to the front axle of the tractor.

By swinging the implement lift lever 20 forwardly and rearwardly about the pivot 56, it will be seen that the actuating bars 50 and 52 will also be reciprocated longitudinally. Furthermore, since the only connection of the actuating bars 50 and 52 to the tractor is by means of the pivotal connection to the lever arms 54, these actuating bars 50 and 52 may be swung vertically. These particular movements are utilized in operating the attachment.

A conventional implement and three-point hitch is indicated generally by the reference numeral 60. This hitch 60 includes an elongated cross member 62 having secured to the extremities thereof two upwardly and angularly inwardly extending bars 64. A rigid, triangular frame portion 66 is secured to the cross member 62 and extends forwardly as shown. Another rigid bar 68 is secured between the front end of this frame portion 66 and the upper ends of the two bars 64 thereby providing a rigid hitch frame. The upper ends of the bars 64 and 66 are pivotally secured to the mid portion of the cross bar 58 by means of a horizontally extending pivot pin 70. Two pivot pins 72 and 74 are welded to the outer extremities, respectively, of the cross member 62. These pins 72 and 74 are coaxial and received, respectively, by the two U-shaped retainers 44 and 46 and there retained in place by means of the lock pins 48. By this means, the hitch frame 60 can be pivoted about the horizontal axis provided by the pins 72 and 74.

A suitable implement, such as a scraper blade 76 may be secured to the three point hitch 60 as desired.

In operating the attachment of this invention, it is only necessary to swing the lever 20 forwardly or rearwardly as required about the pivot 56. In FIG. 1, the lever 20 is shown in its implement actuated position with the scraper blade 76 in ground level position. To raise the blade 76, it is only necessary to swing the lever 20 rearwardly about the pivot 56. This results in moving the two actuating rods 50 and 52 longitudinally rearwardly which in turn pulls the cross bar 58 rearwardly. Since the upper end of the hitch is pivotally connected to the midpoint of the cross bar 58, it too will be drawn rearwardly. This results in pivoting the hitch frame 60 about the pins 72 and 74 thereby lifting the implement or scraper 76 from ground level. It is thus seen that by operating the lever 20, the implement 76 may be moved into desired position.

With the implement 76 in "down" position, the frame bars 22 and 24 will rest normally on the bottom portions of the two brackets 40 and 42. If during forward movement of the tractor the front wheels should drop into a depression, and the implement 76 is held at the same vertical position by its engagement with the ground surface, the two frame bars 22 and 24 will remain in the same spatial position while the tractor frame and brackets 36 and 38 will lower. Relatively, the bars 22 and 24 will rise within the openings 40 and 42. Thus, movement of the front wheels of the tractor over irregular ground will not be imparted to the implement 76. Thus, the implement 76 tends to remain at the level of the ground surface with which it is engaged even though the tractor front may raise and lower slightly due to irregularities of the ground surface.

The present invention is so arranged as to be easily connected to and removed from the tractor. After removing the three point hitch 60, it is only necessary to remove the lock pins 34 and 48. This disconnects the two frame bars 22 and 24 which may merely be withdrawn from the tractor. Removal of the pivot connection of the two bars 50 and 52 to the lift lever 20 is the only remaining step required.

Figure 9:
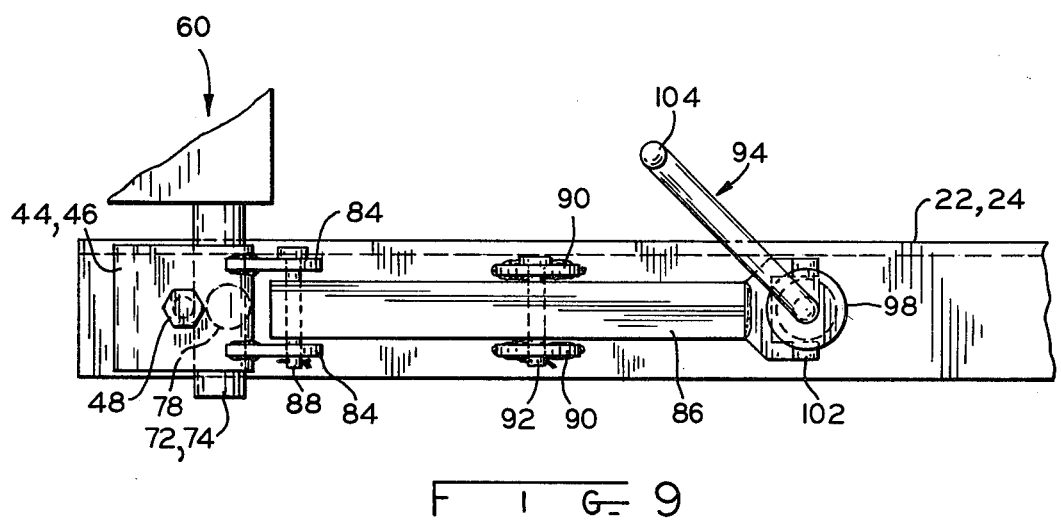
FIG. 9 is a top view of FIG. 8.

Referring to FIGS. 8 and 9, another arrangement is illustrated for attaching the two pivot pins 72, 74 of the three point hitch 60 to the front ends of the two frame bars 22 and 24. Instead of fixedly securing the U-shaped retainers 44, 46 to the front ends of the bars 22, 24, respectively, they are mounted thereon for vertical movement only. This is accomplished by means of two mechanisms, one for each bar 22, 24, these mechanisms being identical. Therefore, a description of one will suffice for both.

As shown in FIGS. 8 and 9, each of the retainers 44, 46 has a depending retaining bar 78 secured at the upper end, as by welding. The bar 78 is slidably received within vertically aligned openings 80 and 82 within the two flanges of the respective frame bar 22, 24, the latter in this instance being channel shaped. Two rearwardly extending and spaced apart brackets 84 are secured as by welding at the left ends thereof to the bight portions of the retainer 44, 46 and an operating lever 86 is pivotally secured at its left end to these brackets 84 by means of a suitable pivot pin 88.

Welded to the respective frame bar 22, 24 are two spaced apart upstanding pivot supports 90 which receive therebetween a lever 86. The lever 86 is pivotally secured to these supports 90 by means of a suitable pivot pin 92. The righthand end of each lever 86 is operatively mounted on a carrier or crank device 94 by means of which lever 86 can be swung vertically about the pivot pin 92. The crank device 94 includes a crank having a stem 96 threadedly received in vertically aligned apertures in the flanges of a respective frame bar 22, 24. To the stem 96 is welded or otherwise secured two spaced apart plates 98 and 100. The righthand end of the lever 86 has a yoke 102 which straddles with clearance the stem 96. Also, the yoke is slidably received between the two plates 98 and 100. As the handle 104 of the crank is rotated, the stem 96 by reason of its threaded connection will raise or lower, carrying with it the two plates 98 and 100 and the yoke end of the lever 86. The yoke 102 accomodates tilting movement of the lever 86 relative to the stem 96.

In operation, the pivot pins 72, 74 of the three point hitch are fastened to the retainers 44, 46 as previously explained. Rotation of the crank 104 in the proper direction will result in lowering the righthand end of the lever 86 and raising the lefthand end. This results in elevating the respective retainer 44, 46 carrying with it the hitch pin 72, 74. By operating both crank devices 94 simultaneously, the hitch can be uniformly raised and lowered to a desired position. When suitably adjusted, the two pins 92 on both bars 22 and 24 will be coaxial and horizontal. The bar 78 which is slidably mounted within the respective frame bars 22, 24 provide the necessary force-transmitting connection between the retainers 44, 46 and the frame bars. Also, these bars 78 hold the retainers against movement except in the vertical direction.

In order to accomodate this swinging movement, suitable lost motion connections may be provided between the pivot pins 88 and the respective levers 86 and mounting brackets 84. For example, the opening in the left end of a lever 86 could be elongated slightly such that swinging movement of the lever end upwardly and downwardly would not cause binding of the restraining bar 78 in its frame bar openings.

As will now be apparent, the two crank devices 94 may be individually or conjointly operated so as to raise the pivot pins 72, 74 of the three point hitch uniformly or to tilt one relative to the other. In so doing, the entire three point hitch is adjusted as desired. The crank devices 94 thus serve as leveling or tilting adjustments for any implement secured to the three point hitch.

While there have been described above the principles of this invention in connection with specific apparatus, it is to be clearly understood that this description is made only by way of example and not as a limitation to the scope of the invention.

What is claimed is:

1. An implement-attaching apparatus for the front end of a tractor comprising a frame device which carries two horizontally spaced supports adapted to receive two coaxial pivot pins, an actuating linkage carrying an elongated cross-bar disposed above and generally in parallelism with said spaced supports, a pivot connection provided on said cross-bar intermediate its ends and generally midway between and above said spaced supports, and means for supporting said frame device for limited vertical, free floating movement, said frame device including two elongated members which are spaced apart and generally parallel, said actuating linkage includes two elongated bars which are also spaced apart and generally parallel to each other and to said elongated members, said two members carrying said two supports, respectively, and said two bars being connected to the opposite end portions, respectively, of said cross-bar, said means including two eyelet elements which are horizontally spaced and which receive said elongated members therethrough, said eyelet elements being of a size as permits vertical movement of said members therein.

2. The apparatus of claim 1, and means for vertically adjusting said supports relative to said members, respectively.

3. The apparatus of claim 2 wherein said adjusting means include two levers pivotally connected to said two elongated members, respectively, said levers paralleling said members and being pivotable about a common horizontal axis, one end of said two levers carrying said two supports, respectively, two vertically extending slide bars secured at the upper ends to said two supports, respectively, said slide bars being mounted on said two members, respectively, for vertical sliding movement, and means attached to the other ends of said levers for selectively moving them vertically relative to said members.

4. The apparatus of claim 3 wherein said selective moving means includes two cranks threadedly connected to said two members, respectively.

* * * * *

UNITED STATES PATENT AND TRADEMARK OFFICE
CERTIFICATE OF CORRECTION

PATENT NO. : 4,436,162
DATED : March 13, 1984
INVENTOR(S) : Michael J. Seibert

It is certified that error appears in the above—identified patent and that said Letters Patent is hereby corrected as shown below:

Column 1, line 13, change "2,269,944" to --2,629,944--.

Signed and Sealed this

Twenty-fourth Day of July 1984

[SEAL]

Attest:

GERALD J. MOSSINGHOFF

Attesting Officer     Commissioner of Patents and Trademarks